United States Patent
Thaler

(10) Patent No.: US 7,418,815 B2
(45) Date of Patent: Sep. 2, 2008

(54) PARTICULATE TRAP WITH ELECTROSTATIC PRECIPITATOR

(75) Inventor: David Michael Thaler, Mossville, IL (US)

(73) Assignee: Caterpillar Inc., Peoria, IL (US)

( * ) Notice: Subject to any disclaimer, the term of this patent is extended or adjusted under 35 U.S.C. 154(b) by 56 days.

(21) Appl. No.: 10/902,288

(22) Filed: Jul. 30, 2004

(65) Prior Publication Data
US 2006/0021333 A1 Feb. 2, 2006

(51) Int. Cl.
*F01N 3/00* (2006.01)
*F01N 3/02* (2006.01)

(52) U.S. Cl. ............................. 60/275; 60/295; 60/297; 60/311

(58) Field of Classification Search .................. 60/275, 60/295, 297, 311
See application file for complete search history.

(56) References Cited

U.S. PATENT DOCUMENTS

| | | | |
|---|---|---|---|
| 3,299,620 A | 1/1967 | Hollingworth | |
| 4,244,710 A | 1/1981 | Burger | |
| 4,451,441 A | 5/1984 | Ernest et al. | |
| 4,478,613 A * | 10/1984 | Brettschneider et al. | 96/61 |
| 4,485,622 A * | 12/1984 | Takagi et al. | 60/296 |
| 4,558,565 A * | 12/1985 | Kojima et al. | 60/286 |
| 4,744,910 A | 5/1988 | Bossard | |
| 4,791,785 A * | 12/1988 | Hudson et al. | 60/303 |
| 4,887,427 A * | 12/1989 | Shinzawa et al. | 60/286 |
| 5,067,320 A * | 11/1991 | Kanesaki | 60/297 |
| 5,489,319 A * | 2/1996 | Tokuda et al. | 96/400 |
| 5,492,677 A * | 2/1996 | Yoshikawa | 422/174 |
| 5,557,923 A * | 9/1996 | Bolt et al. | 60/274 |
| 5,647,890 A | 7/1997 | Yamamoto | |
| 5,758,495 A * | 6/1998 | Serra | 60/275 |
| 5,879,435 A * | 3/1999 | Satyapal et al. | 96/16 |
| 5,950,424 A * | 9/1999 | Nojima | 60/275 |
| 5,979,507 A * | 11/1999 | Kojima et al. | 138/39 |
| 6,185,934 B1 | 2/2001 | Teboul | |
| 6,221,136 B1 * | 4/2001 | Liu et al. | 96/66 |
| 6,233,926 B1 * | 5/2001 | Bailey et al. | 60/295 |
| 6,708,486 B2 * | 3/2004 | Hirota et al. | 60/297 |
| 6,772,584 B2 * | 8/2004 | Chun et al. | 60/275 |

OTHER PUBLICATIONS

Wright, et. al., "A Novel Electrostatic Method of Ultrafine PM Control Suitable for Low Exhaust Temperature Applications," SAE Technical Paper Series 2003-01-0771, Mar. 3-6, 2003, (11 pages).

Kittelson, et al., "Electrostatic Collection of Diesel Particles," SAE Paper 860009, pp. 19-30 (12 pages).

(Continued)

*Primary Examiner*—Thomas Denion
*Assistant Examiner*—Loren Edwards
(74) *Attorney, Agent, or Firm*—Finnegan, Henderson, Farabow, Garrett & Dunner

(57) ABSTRACT

A particulate trap has a housing with an inlet and an outlet. The particulate trap also has a plurality of filters disposed within the housing in parallel relation. The particulate trap further has at least one electrode disposed within the housing and configured to impart a charge to particulates entrained within an exhaust flow as the particulates pass near the at least one electrode.

12 Claims, 4 Drawing Sheets

OTHER PUBLICATIONS

Thimsen, et al., "The Performance of an Electrostatic Agglomerator as a Diesel Soot Emission Control Device," SAE Technical Paper Series 900330, Feb. 26-Mar. 2, 1990, (12 pages).

Ekchian, et al., "A Compact Corona Discharge Device (CDD™) For Non-Thermal Plasma Generation in Gasoline or Diesel Engine Exhaust," Litex, Inc., 2000, (7 pages).

William C. Hinds, "Aerosol Technology, Properties, Behavior, and Measurement of Airborne Particles," (2nd Edition, Jan. 8, 1998), pp. 338-348.

* cited by examiner

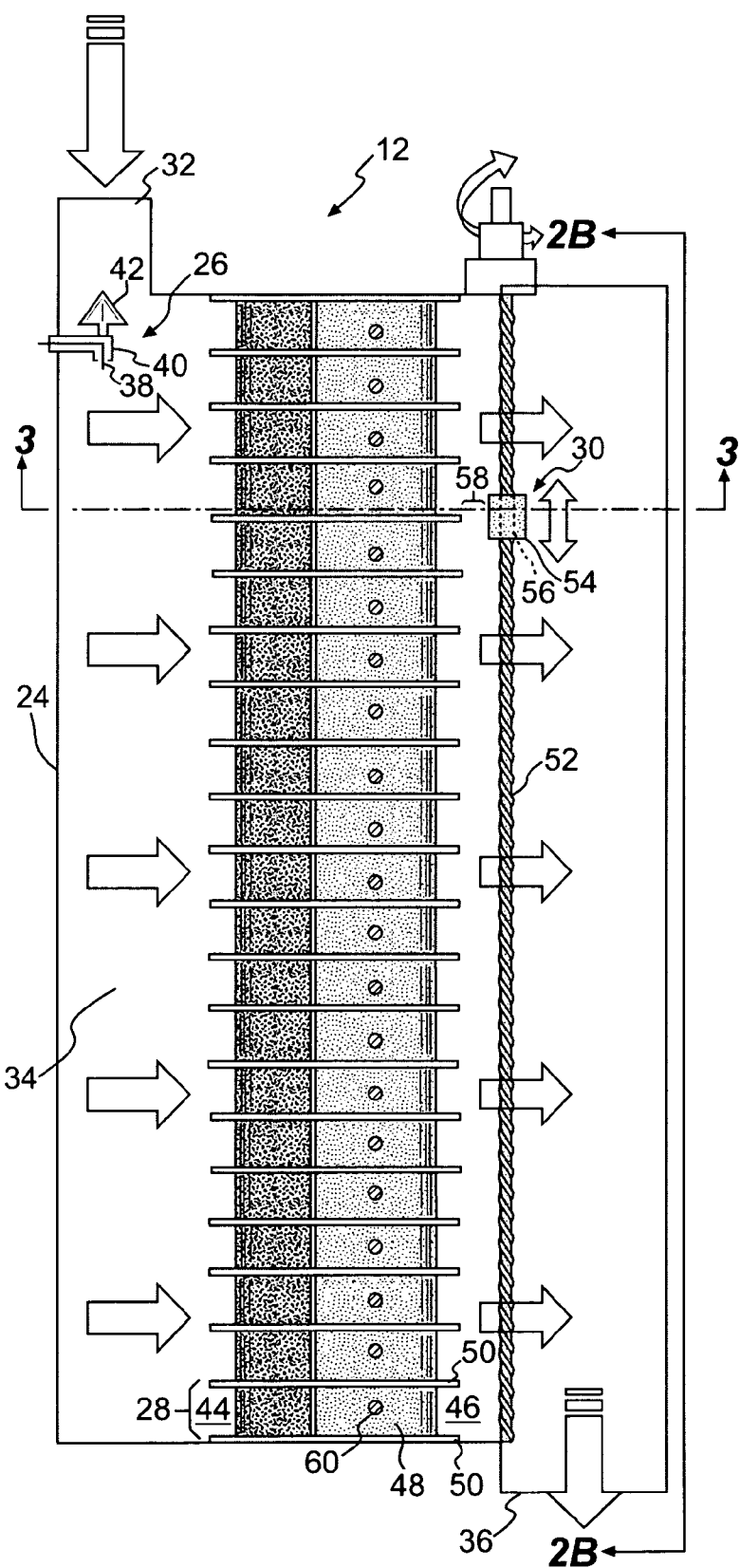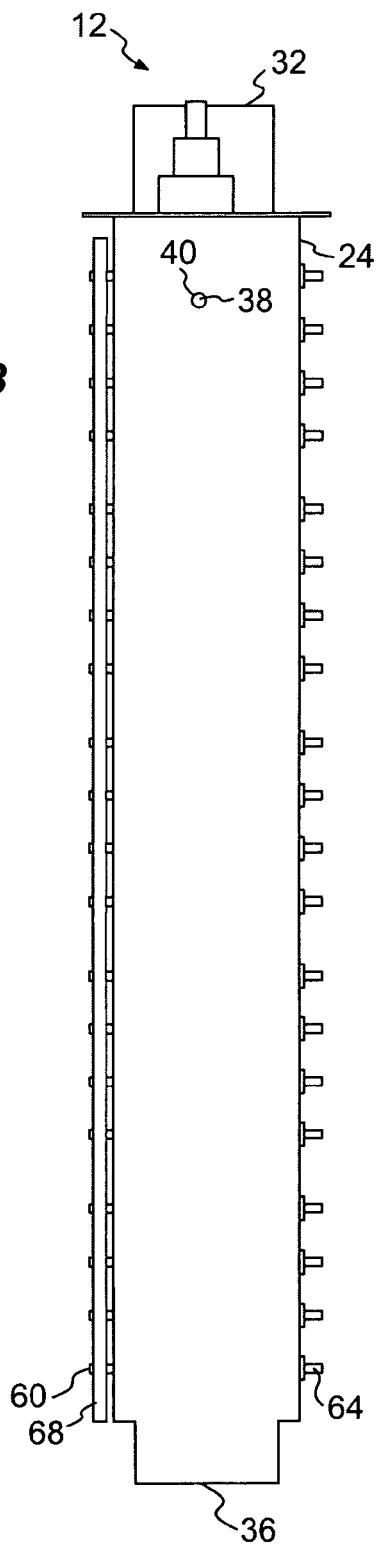
*FIG. 2A*  *FIG. 2B*

PARTICULATE TRAP WITH ELECTROSTATIC PRECIPITATOR

TECHNICAL FIELD

The present disclosure relates generally to a particulate trap and, more particularly, to a particulate trap with an electrostatic precipitator.

BACKGROUND

Internal combustion engines, including diesel engines, gasoline engines, natural gas engines, and other engines known in the art, may exhaust a complex mixture of air pollutants. The air pollutants may be composed of gaseous compounds and solid particulate matter, which may include unburned carbon particles called soot.

Due to increased attention on the environment, exhaust emission standards have become more stringent and the amount of particulates emitted from an engine may be regulated depending on the type of engine, size of engine, and/or class of engine. One method that has been implemented by engine manufacturers to comply with the regulation of particulate matter exhausted to the environment has been to remove the particulate matter from the exhaust flow of an engine using a particulate trap. A particulate trap is a filter designed to trap particulate matter in, for example, a mesh filtering media. Such a fine mesh filter media, designed to entrap small particulate matter, may saturate quickly with both large and small particulate matter, resulting in undesirable exhaust system back pressure. A coarse wire mesh filter media, designed to only trap large particulate matter without increasing exhaust system back pressure, however, may allow the smaller particulate matter to be exhausted to the atmosphere.

One method of trapping both large and small particulate matter within the same particulate trap without creating undesirable exhaust flow restriction is described in U.S. Pat. Ser. No. 5,557,923 (the '923 patent) issued to Bolt et al. on Sep. 24, 1996. The '923 patent describes a device for removing particulates produced by internal combustion engines that includes an electrode for electrostatically charging the particulates. The charged particulates are attracted to and trapped within an electrically grounded fine-mesh filter. A current is passed through the filter at regular intervals causing the filter material to heat to a temperature above the combustion temperature of the particulates (i.e., regeneration).

Although the device of the '923 patent may reduce the number of large and small particulates exhausted to the environment without increasing exhaust system back pressure, the device may require large amounts of energy during regeneration. The large amounts of energy may require large power producing components and power circuitry. As a result, initial cost as well as operational costs of the engine system utilizing the device may be expensive.

The disclosed particulate trap is directed to overcoming one or more of the problems set forth above.

SUMMARY OF THE INVENTION

In one aspect, the present disclosure is directed to a particulate trap that includes a housing with an inlet and an outlet. The particulate trap also includes a plurality of filters disposed within the housing in parallel relation. The particulate trap further includes at least one electrode disposed within the housing and configured to impart a charge to particulates entrained within an exhaust flow as the particulates pass near the at least one electrode.

In another aspect, the present disclosure is directed to a method of operating a particulate trap. The method includes charging particulates entrained within an exhaust flow with at least one electrode and filtering particulates from the exhaust flow with a plurality of filters in parallel relation.

BRIEF DESCRIPTION OF THE DRAWINGS

FIG. 2A is a front view diagrammatic illustration of a particulate trap according to an exemplary disclosed embodiment;

FIG. 2B is a side view diagrammatic illustration of a particulate trap according to an exemplary disclosed embodiment;

DETAILED DESCRIPTION

Figure 1:
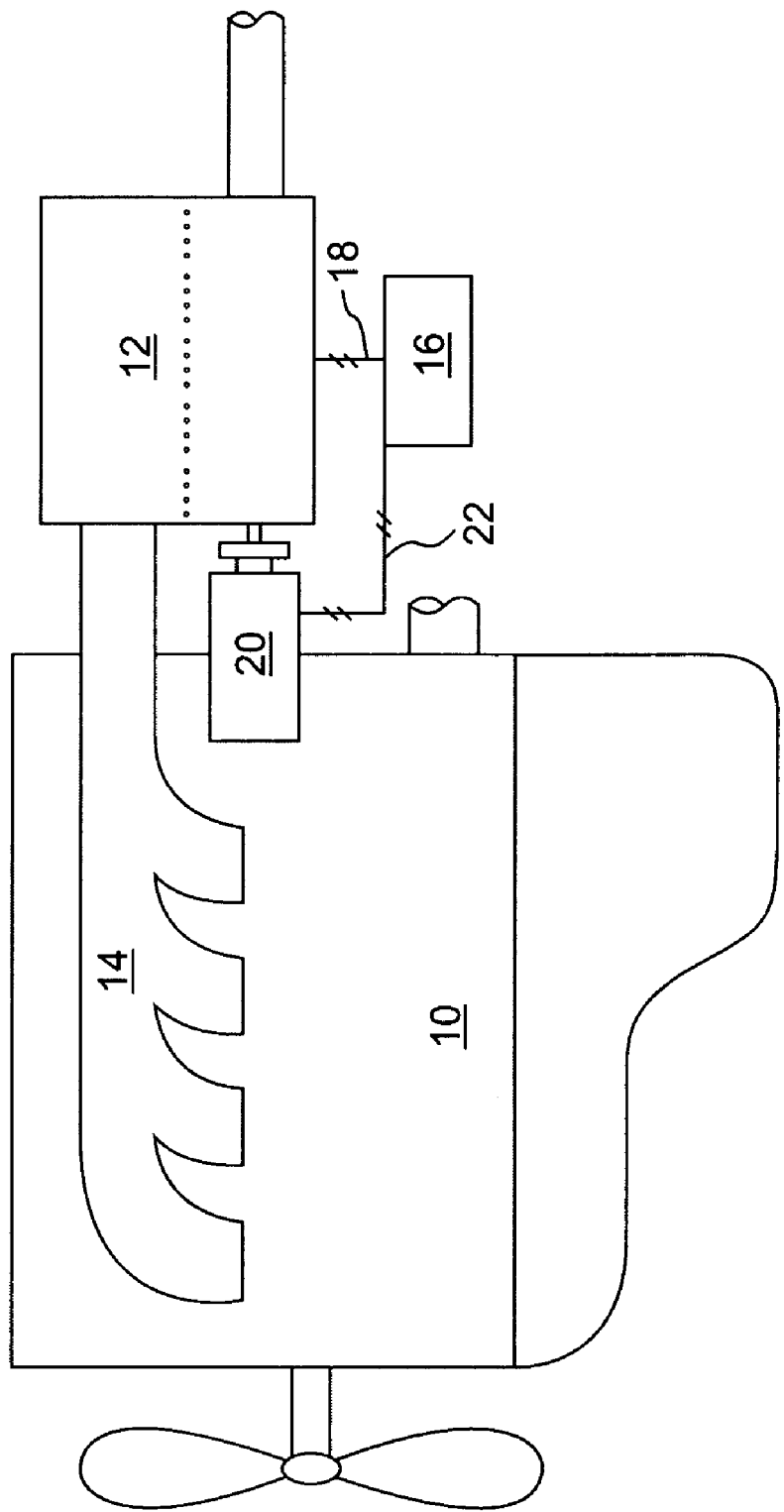
FIG. 1 is a diagrammatic illustration of an engine having a particulate trap according to an exemplary disclosed embodiment.

FIG. 1 illustrates an engine 10 connected to an exemplary particulate trap 12. Engine 10 may include an exhaust manifold 14 connecting an exhaust flow of engine 10 with particulate trap 12. A controller 16 may be in communication with particulate trap 12 via a communication line 18 and with a motor 20 via a communication line 22. As illustrated in FIGS. 2A and 2B, particulate trap 12 may include a housing 24, an electrostatic device 26, one or more filters 28, and a blocking device 30.

Housing 24 may have an inlet 32 connected to exhaust manifold 14, a main chamber 34, and an outlet 36. Housing 24 may have a substantially oval-shaped cross-section along a length direction. It is contemplated that housing 24 may have a cross-sectional shape other than oval-shaped such as, for example, cylindrical, square, rectangular, or another appropriate shape. At least a portion of inlet 32 and outlet 36 may have a substantially circular cross-section. It is contemplated that inlet 32 and outlet 36 may have a differently shaped cross-section such as square, rectangular, triangular, or other suitable cross-section. Inlet 32 and outlet 36 may be generally aligned with the length direction of housing 24 and may be disposed on opposite sides of main chamber 34. Inlet 32 may protrude from a first end of particulate trap 12 in the length direction of housing 24. Outlet 36 may protrude from a second end of particulate trap 12, opposite the first end.

Electrostatic device 26 may be disposed within housing 24, between inlet 32 and filters 28 and configured to charge particulates entrained within the exhaust flow from engine 10 before the particulates reach filters 28. Electrostatic device 26 may include an electrode 38, an insulating means 40, and a diverter 42.

Electrode 38 may protrude inward from housing 24 and may be connected to a high-voltage source (not shown) configured to apply a voltage to electrode 38. The voltage applied to electrode 38 may range from 5,000 volts to 30,000 volts or higher, with a preferred range of 7,500 volts to 20,000 volts. As the voltage is applied to electrode 38, a charge is imparted to the particulates flowing past electrode 38. It is contemplated that more than one electrode 38 may be included within particulate trap 12.

Electrode 38 may be electrically insulated from housing 24 via insulating means 40. Insulating means 40 may be any means for electrically insulating electrode 38 from housing 24 such as, for example, a sleeve positioned between electrode 38 and housing 24 made from an electrically non-conductive material such as, for example, a ceramic, a high-temperature plastic, a fibrous composite, or any other means known in the art. Insulating means 40 may be connected to housing 24.

Diverter 42 may be disposed within housing 24 upstream from electrode 38 and insulating means 40. Diverter 42 may be connected to insulating means 40 or, alternately, may be connected directly to housing 24. Diverter 42 may have a generally conical shape, with the apex distally upstream from electrode 38. It is also contemplated that diverter 42 may have a shape other than conical such as, for example, wedge-shaped, spherical, pyramidial, or another appropriate shape. Diverter 42 may be configured to divert the exhaust flow around electrode 38, thereby minimizing or preventing particulate matter from depositing on electrode 38. It is also contemplated that diverter 42 may be omitted from the system, if desired.

Each filter 28 may include one or more serpentine-shaped metal fiber media 48. Metal fiber media 48 of one filter may be separated from metal fiber media 48 of adjacently stacked filters 28 by electrically insulating dividers 50. Alternately, each of filters 28 may include an electrically conductive ceramic filter media or an electrically non-conductive ceramic filter media having electrically conductive fibers interwoven or dispersed within the ceramic filter media. It is contemplated that metal fiber media 48 may have a shape other than serpentine such as, for example, planar. Although a single column of stacked filters 28 is depicted in FIG. 2A, it should be noted that particulate trap 12 may include multiple columns of filters 28.

Main chamber 34 may provide exhaust flow in parallel to and away from each filter 28. Insulating dividers 50, together with housing 24, may form separate fluid pathways through each filter 28 with an inlet 44 and an outlet 46. Exhaust flow may be directed from inlet 44 transversely across metal fiber media 48 of filters 28 to outlet 46. It is also contemplated that one or more filters 28 may be disposed within housing 24 in series relationship.

Blocking device 30 may be configured to selectively block exhaust flow through each filter 28. Blocking device 30 may include a drive means 52 connected to motor 20 (referring to FIG. 1) and a blocking portion 54. Drive means 52 may include a lead screw, such as a ball screw, a planetary roller screw, a frictional roller screw, or any other type of lead screw that translates rotational motion of motor 20 into linear motion of blocking portion 54. Drive means 52 may be rotatably connected to a first end of particulate trap 12 and extend through a second end of particulate trap 12, opposite the first end, to connect with motor 20. Blocking device 30 may be disposed between filters 28 and outlet 36 to block exhaust flow from filters 28. It is contemplated that blocking device 30 may alternately be disposed between inlet 32 and filters 28 to block exhaust flow to filters 28.

Blocking portion 54 may block exhaust flow through each filter 28 by linear movement past one or more outlets 46 associated with each filter 28. Blocking portion 54 may be generally box-shaped, having length, width, and thickness directions. Blocking portion 54 may include internal threads 56 centrally located relative to the length and width directions of blocking portion 54. It is contemplated that threads 56 may be absent and bearings, or any other means for engaging threads of drive means 52, may be included. Blocking portion 54 may include a means for maintaining constant orientation of blocking portion 54 relative to filters 28, as drive means 52 rotates, to cause linear translation of blocking portion 54. Such means may include, for example, protrusions on opposite ends of blocking portion 54 configured to engage channels within housing 24, bearings configured to run within tracks connected to housing 24, one or more guide rods attached to housing 24 and configured to engage bearing sleeves within blocking portion 54, a second lead screw configured to engage additional internal threads within blocking portion 54, or any other means known in the art.

A clearance 58 may be maintained between insulating dividers 50 and blocking portion 54 to provide a certain amount of exhaust flow even when blocking portion 54 is in the blocked position relative to filters 28. The term blocked, for the purposes of this disclosure, may refer to a range of exhaust flow restriction from partially restricted to fully restricted.

Figure 3:
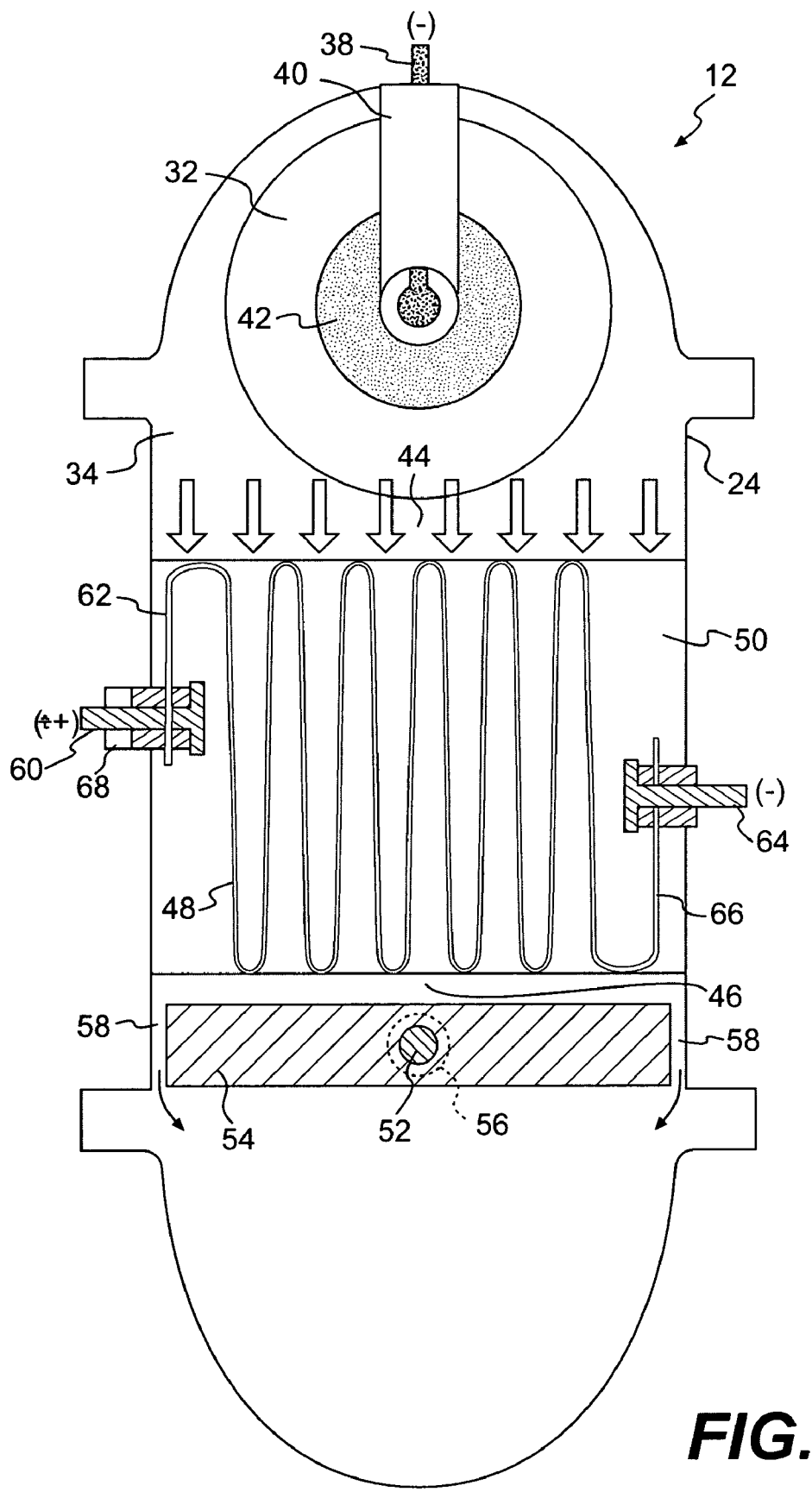
FIG. 3 is a cross-sectional bottom view diagrammatic illustration of a particulate trap according to an exemplary disclosed embodiment.

As illustrated in FIGS. 2B and 3, particulate trap 12 may include first and second electrical connectors 60, 64 associated with each filter 28. In particular, first electrical connector 60 may extend from a region adjacent to a first end 62 of metal fiber media 48 and second electrical connector 64 may extend from a region adjacent to a second end 66 of metal fiber media 48. First end 62 and second end 66 may be oriented substantially orthogonal to a flow of exhaust from inlet 44 through outlet 46. First and second electrical connectors 60, 64 may extend through housing 24 and may selectively connect one or more filters 28 to either a power source (not shown) or to a ground via permanent or quick disconnect connectors. The one or more filters 28 may be connected to the power source to cause resistance heating of filters 28, thereby regenerating filters 28. The one or more filters 28 may be connected to the ground to create an electrostatic attraction between the charged particulate matter and grounded filters 28. First electrical connectors 60 may be connected to each other via a common bus bar 68. It is contemplated that first electrical connectors 60 may alternately be connected to each other via crimped connectors, ring terminals, or in any other manner known in the art. It is further contemplated that second electrical connectors 64 may be connected to each other via a common bus.

Controller 16 (referring to FIG. 1) may include various components to operate particulate trap 12 such as, for example, a memory, a secondary storage device, and a processor. Various circuits may be associated with controller 16 such as, for example, power supply circuitry, signal conditioning circuitry, solenoid driver circuitry, and other appropriate circuitry.

Motor 20 (referring to FIG. 1) may be connected to drive means 52 to cause drive means 52 to rotate. Rotation of motor 20 may cause blocking portion 54 to linearly move in the particulate trap length direction past outlets 46 of filters 28. Motor 20 may rotate continuously or in a step-wise manner. Motor 20 may be electrically driven, mechanically driven, hydraulically driven, pneumatically driven, or driven in any other manner known in the art. Motor 20 may be directly connected to drive means 52 or may be connected via a ratcheting device, a pulley system, a gear system, or in any other appropriate manner.

It is contemplated that motor 20 may be omitted and a different actuator included such as, for example, a hydraulic device, a solenoid device, a piezo device, or another means for actuating. The different actuator may be connected to drive means 52 via a ratcheting mechanism, a rack and gear mechanism, a screw and gear mechanism, or in any other manner known in the art.

Figure 4:
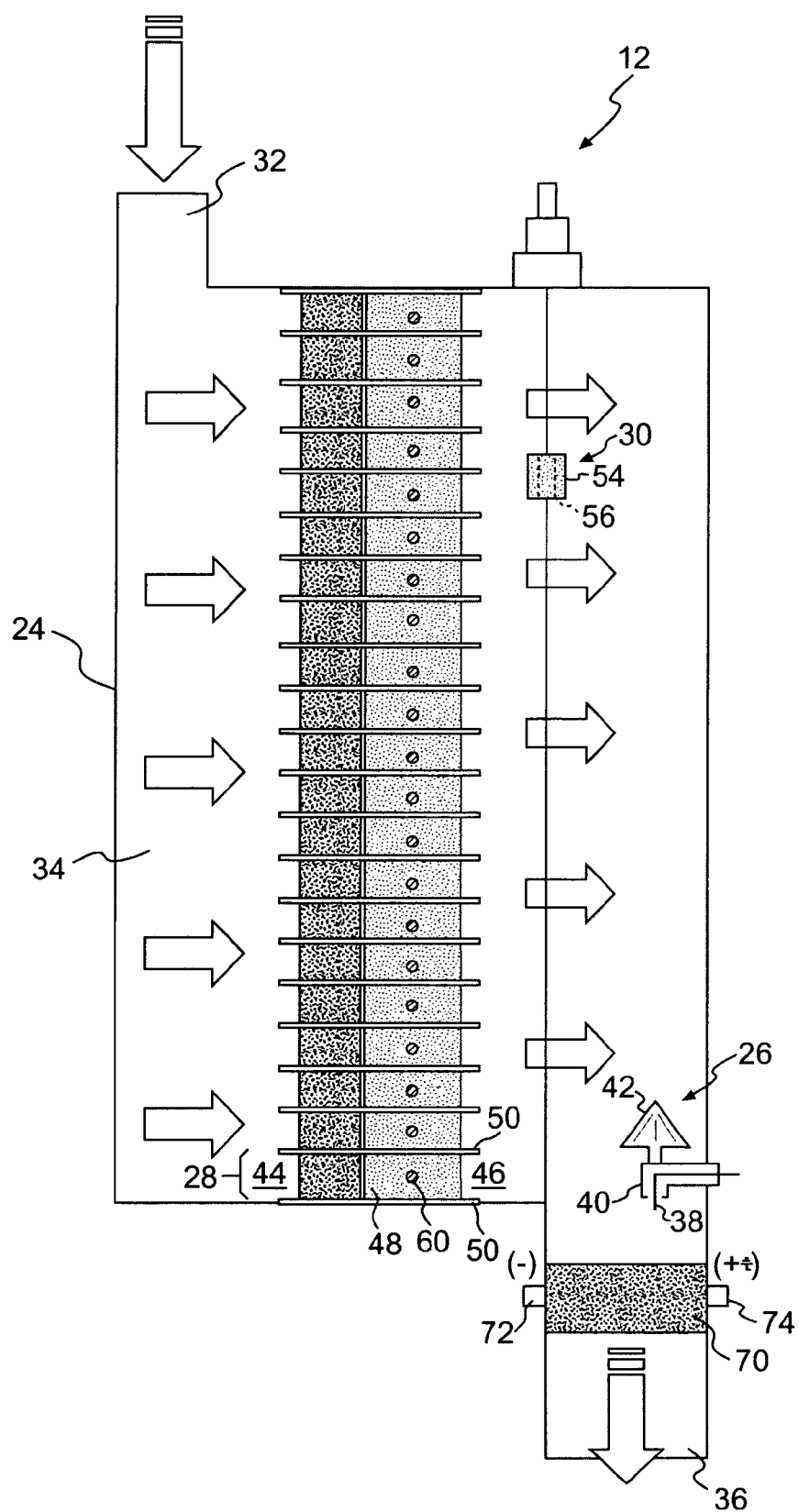
FIG. 4 is a front view diagrammatic illustration of a particulate trap according to an exemplary disclosed embodiment.

FIG. 4 illustrates an alternate embodiment of particulate trap 12. In contrast to the embodiment of FIG. 2A, electrostatic device 26 of FIG. 4 is located down stream of filters 28, and upstream from a course filter 70. In addition, housing 24 and filter 70 may be electrically grounded instead of filters 28, thereby causing particulates that are charged downstream of filters 28 to adhere to housing 24 and filter 70.

Filter 70 may include an electrically conductive metal fiber media and first and second electrical connectors 72, 74. It is contemplated that filter 70 may alternately include an electrically conductive ceramic filter media or an electrically non-conductive ceramic filter media having electrically conductive fibers interwoven or dispersed within the ceramic filter media. First and second electrical connectors 72, 74 may extend through housing 24 from opposite sides of the metal fiber media 48 of filter 70 to selectively connect filter 70 to either a power source (not shown) or a ground via permanent or quick disconnect connectors.

INDUSTRIAL APPLICABILITY

The disclosed particulate trap may be applicable to any combustion-type device such as, for example, an engine, a furnace, or any other device known in the art where the removal of particulate matter from an exhaust flow is desired. Particulate trap 12 may be a simple, inexpensive, and compact solution for reducing the amount of large and small particulate matter exhausted to the environment without adversely affecting exhaust system back pressure. Because of its modular filter design, particulate trap 12 may be easily expanded to accommodate a range of filtering requirements by adding or removing filters 28. In addition, separately regenerable filters have low power requirements for regeneration, allowing for low-cost power electronics and high engine efficiency. The operation of particulate trap 12 will now be explained.

As exhaust from engine 10 enters particulate trap 12 of FIG. 2A via inlet 32, voltage may be applied to electrode 38 causing electrode 38 to emit electrons thereby creating an ionizing field. This ionizing field may negatively charge particulate matter that is entrained within the exhaust flow as the particulate matter enters the ionizing field. In order to minimize or prevent the particulate matter from adhering to electrode 38 and causing fouling, the exhaust flow may be diverted around electrode 38 by diverter 42. It is contemplated that the particulate matter may alternately be positively charged.

Simultaneous to charging the particulate matter, filters 28 may be electrically grounded, thereby creating an electrostatic attraction between the charged particulate matter and grounded filters 28. This electrostatic attraction may cause the charged particulate matter to migrate toward and adhere to filters 28. This attraction may increase the trapping and retaining efficiencies of metal fiber media 48 relative to a particulate trap, which does not include an electrostatic device.

As the charged particulate matter is deposited on metal fiber media 48 of filters 28, the particulate matter may agglomerate into a soot cake of appreciable mass. If left unchecked, the particulate matter buildup could partially or even fully restrict the flow of exhaust through metal fiber media 48, allowing for pressure within the exhaust system of engine 10 to increase. An increase in the back-pressure of engine 10 could reduce the engine's ability to draw in fresh air, resulting in decreased performance of engine 10.

To minimize or prevent the undesired buildup of particulate matter within particulate trap 12, individual filters 28 may be independently regenerated. Regeneration may be periodic or based on a triggering condition. The triggering condition may be, for example, a lapsed time of engine operation, a pressure differential measured across particulate trap 12, or any other condition known in the art.

Controller 16 may be configured to cause regeneration of filters 28. When controller 16 determines that regeneration is required (e.g., when engine 10 has operated for a predetermined time period, or when a pressure measured across particulate trap 12 is greater than a predetermined value), controller 16 may cause drive means 52 to rotate with respect to housing 24. As drive means 52 rotates, blocking portion 54 will linearly translate to align with outlet 46 of at least one filter 28 to block exhaust through the at least one filter 28. Exhaust flow through each of filters 28, when blocked, may be limited to, for example, about 0.5%-2.0% of the flow through an unblocked filter 28. Some flow of exhaust through blocked filter 28 may be necessary to provide sufficient oxygen for combustion of the particulate matter trapped within filter 28.

When the exhaust flow is blocked through filter 28, controller 16 may connect the power source (not shown) to the blocked filter 28 via first and second electrical connectors 60, 64. Current from the power source may resistively heat the particulate matter trapped within the at least one blocked filter 28 above the combustion temperature.

Blocking the exhaust flow from the regenerating filter 28 may reduce the energy required for regeneration because the exhaust flow, which is comparatively cool relative to the regeneration temperature, may remove heat during the regeneration process. In addition, because the filter undergoing regeneration is substantially fluidly isolated from other filters 28 within particulate trap 12, the exhaust flowing through non-regenerating filters 28 does not affect the amount of energy required to regenerate the fluidly isolated filter 28. Further, because the majority of filters 28 are not blocked during regeneration, the increase in back pressure due to the regeneration process may be negligible and the overall size of particulate trap 12 may be reduced.

In contrast to the embodiment of FIG. 1, particulate trap 12 of FIG. 4 may charge only the particulate matter that has already passed through filters 28. In particular, as the exhaust flows from engine 10 through inlet 32 into main chamber 34, large particulate matter may be filtered from the exhaust flow by filters 28 without the aid of electrostatic device 26. The particulate matter may build up and be stored within filters 28 until a regeneration event. Small particulate matter that has passed through filters 28 may continue to flow through main chamber 34 and enter the ionizing field of electrode 38, downstream of filters 28. Simultaneously, housing 24 and filter 70 may be electrically grounded, thereby creating an electrostatic attraction between the particulate matter, which is charged downstream of filters 28, and grounded housing 24 and filter 70.

As the electrostatic attraction causes the small particulate matter to deposit on housing 24 downstream of filters 28, the particulate matter may agglomerate into a soot cake of appreciable mass. As the mass reaches a point where its natural adhesion becomes unstable, it flakes off of housing 24 and is swept downstream to impinge on filter 70. The small particulate matter may also be electrostatically attracted to and adhere directly to filter 70. Once impinged on filter 70, the flakes of agglomerated particulate matter may be stored until a regeneration event. Similar to the process of regeneration described above for filters 28, a power source (not shown)

may apply electrical current to electrical connectors 72 and 74 resistively heating the particulate matter trapped within the metal fiber media above the combustion temperature.

It will be apparent to those skilled in the art that various modifications and variations can be made to the disclosed particulate trap. Other embodiments will be apparent to those skilled in the art from consideration of the specification and practice of the disclosed particulate trap. It is intended that the specification and examples be considered as exemplary only, with a true scope being indicated by the following claims and their equivalents.

What is claimed is:

1. A method of operating a particulate trap, the method comprising:
    charging particulates entrained within an exhaust flow with an electrode;
    filtering particulates from the exhaust flow with a plurality of filters in parallel relation downstream of the electrode within a housing of the particulate trap, wherein at least one of the plurality of filters is electrically grounded; and
    selectively blocking exhaust flow through at least one of the plurality of filters, including, in at least some circumstances, blocking one or more of the plurality of filters disposed in parallel relation in the particulate trap without blocking one or more others of the plurality of filters disposed in parallel relation within the particulate trap.

2. The method of claim 1, further including diverting the exhaust flow around the electrode.

3. The method of claim 1, further including measuring an operating parameter of the particulate trap and initiating selective blocking when the measured operating parameter satisfies a predetermined condition.

4. The method of claim 3, wherein the operating parameter is a lapsed time period of exhaust flow through at least one of the plurality of filters.

5. The method of claim 3, wherein the operating parameter is a pressure of the exhaust flow measured across at least one of the plurality of filters.

6. The method of claim 1, further including selectively applying an electric current to at least one of the plurality of filters to resistively heat the at least one of the plurality of filters as exhaust flow through the at least one of the plurality of filters is blocked.

7. The method of claim 1, wherein selectively blocking exhaust flow through at least one of the plurality of filters includes restricting the flow of exhaust to about 2% or less of an unblocked exhaust flow through each of the plurality of filters.

8. A power system, comprising:
    a power source operable to produce a flow of exhaust; and
    a particulate trap configured to receive the flow of exhaust, the particulate trap including:
        a housing having an inlet and an outlet;
        a plurality of filters disposed within the housing in parallel relation, wherein at least one of the plurality of filters is electrically grounded; and
        an electrode disposed within the housing upstream of the plurality of filters and configured to impart a charge to particulates entrained with the exhaust flow as the particulates pass the electrode; and
    a blocking device configured to selectively block exhaust flow through at least one of the plurality of filters, including selectively blocking one or more of the plurality of filters disposed in parallel relation within the particulate trap without blocking one or more others of the plurality of filters disposed in parallel relation within the particulate trap.

9. The power system of claim 8, further including:
    a diverter disposed upstream of the electrode and configured to divert the exhaust flow around the electrode;
    an electrical circuit in separate communication with each of the plurality of filters and configured to selectively cause resistive heating of at least one of the plurality of filters as exhaust flow is selectively blocked through the at least one of the plurality of filters; and
    a controller in communication with the particulate trap and configured to cause the blocking device to selectively block the exhaust flow when a predetermined condition has been met.

10. The power system of claim 9, wherein the predetermined condition includes a lapsed time period of exhaust flow through each of the plurality of filters.

11. The power system of claim 9, wherein the predetermined condition includes a pressure differential across the plurality of filters being greater than a predetermined pressure differential.

12. The power system of claim 8, wherein the plurality of filters includes a first filter and a second filter, the first filter being disposed on a flow path parallel to a flow path the second filter is disposed on.

* * * * *